R. E. CHAPMAN AND J. W. KIRK.
METHOD AND APPARATUS FOR CUTTING METAL.
APPLICATION FILED JUNE 29, 1918.
1,324,337.
Patented Dec. 9, 1919.
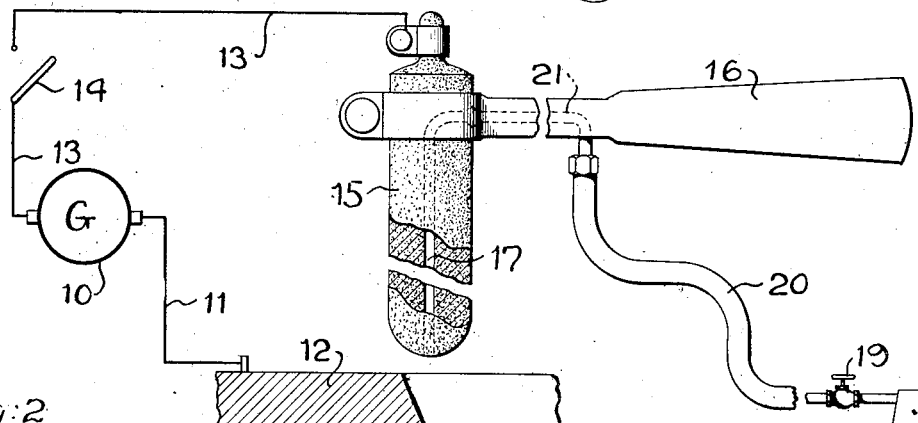
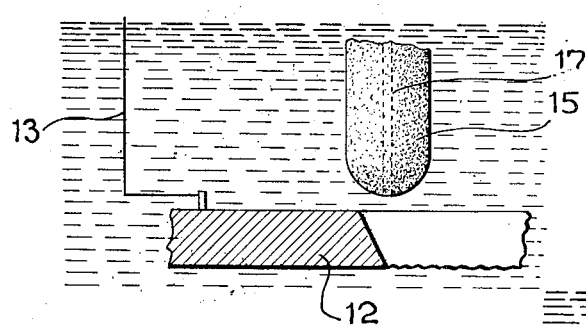
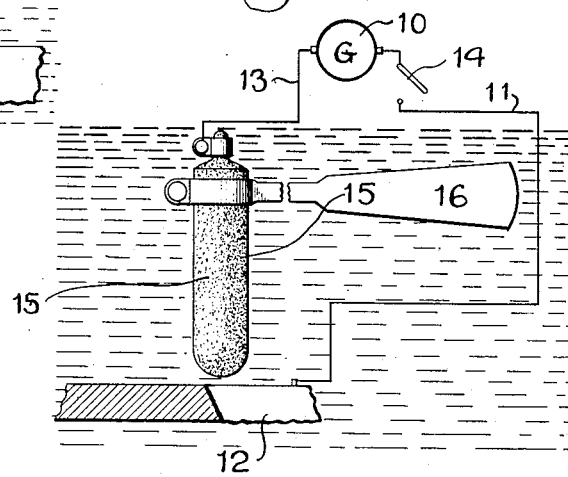
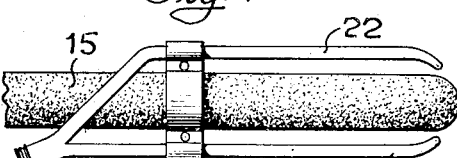
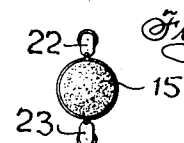
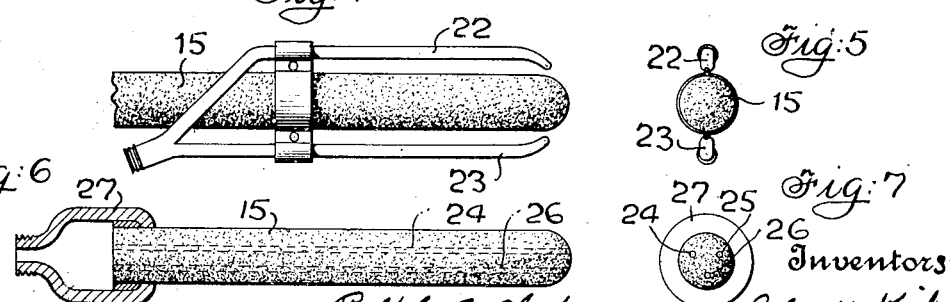
Inventors
Ralph E. Chapman and John W. Kirk
By their Attorneys

UNITED STATES PATENT OFFICE.

RALPH E. CHAPMAN, OF BROOKLYN, AND JOHN W. KIRK, OF NEW YORK, N. Y.; SAID KIRK ASSIGNOR TO SAID CHAPMAN.

METHOD AND APPARATUS FOR CUTTING METAL.

1,324,337.   Specification of Letters Patent.   Patented Dec. 9, 1919.

Application filed June 29, 1918. Serial No. 242,635.

*To all whom it may concern:*

Be it known that we, RALPH E. CHAPMAN and JOHN W. KIRK, citizens of the United States, and residents, respectively, of the borough of Brooklyn of the city of New York, in the county of Kings and State of New York, and of the borough of Manhattan of the city of New York, in the county of New York and State of New York, have invented an Improvement in Methods and Apparatus for Cutting Metal, of which the following is a specification.

The present invention relates to a method of cutting or welding metal and preferred apparatus which may be used in carrying out the hereinafter described method.

The principal object of the invention is to utilize an electric arc in cutting or welding operations so that the intense heat of the arc may be rendered available for such work and provide a simple and effective means of accomplishing the desired results. The invention may find its more general application in the cutting of metal and it will therefore be described in that connection. Those skilled in the art will readily perceive the availability of the invention for welding operations and no specific reference will be made thereto.

The invention will be described by reference to the accompanying diagrammatic drawings which show an illustrative embodiment of certain preferred apparatus. In the drawings;

Figures 1, 2 and 3 are diagrammatic illustrations of apparatus for carrying out the invention under different conditions.

Figs. 4 and 5 are respectively an elevation and an end view of a modified form of electrode, and Figs. 6 and 7 are similar views of another modified form of electrode.

Referring to the drawings a generator for supplying a suitable electric current is shown at 10 and is connected by a lead 11 with a piece of metal, herein shown as sheet metal, 12, which it is desired to cut. The other lead 13 from the generator is connected through a switch 14 with an electrode 15, preferably made of carbon. A heavily insulated handle 16 is attached to the electrode so that the same may be manipulated. It will be readily understood that when the generator circuit is closed by closing the switch, touching and immediately withdrawing the electrode slightly from the metal, an arc will be formed between the electrode and the metal. With a suitable current the temperature of the arc will be high enough to fuse the metal which will tend to flow from the crater of the arc. With proper manipulation of the electrode the metal may be fused along any line desired and a cut formed therein. This cutting of the metal, however, is due entirely to the melting action produced by the high temperature of the arc.

We propose to use in connection with the arc, a supply of oxygen or other suitable oxidizing agent and feed the same into the arc preferably toward the metal to be cut so that as the metal is brought to the temperature at which oxidation will take place the oxygen will unite therewith and thus assist to remove at least some of the metal along the line of the cut which is to be made.

Preferably the oxygen is fed into the arc in the form of a jet under high pressure and is directed toward the arc crater formed upon the metal. Thus as the cutting proceeds the chemical action of the oxygen upon the metal will be supplemented by a mechanical action due to the high pressure at which the oxygen is delivered which will tend to cause the molten metal, as well as the resulting oxids, to flow out of the arc crater. As soon as the metal is perforated the oxygen jet will tend to drive through the cut, the molten metal and oxids formed, thus making a relatively clean cut.

The oxygen which is introduced into the arc will not assist in raising the temperature thereof, but may on the contrary, slightly lower the temperature as the oxygen is of itself non combustible. But the temperature of an arc may be so easily brought to a point greatly in excess of that necessary for fusing the metal that a slight cooling is immaterial. As the oxygen does not enter into the heat production which is taken care of by the electric current, it is all available for oxidizing the metal and removing the metal and oxids from the cut.

Referring again to the drawings, Fig. 1 shows preferred means for introducing an oxygen jet into the arc. Therein the carbon electrode 15 is provided with a centrally located bore 17 which is suitably connected with a source of oxygen under pressure, as a tank 18. The connection here shown is through a valve 19, a hose 20, and a duct 21 within the handle 16 which duct is connected with the bore 17. This provides for the delivery of oxygen through the center of the arc and directly at the metal to be cut. The oxygen delivered in this manner may tend to cool the electrode to some degree.

Figs. 4 and 5 show a modified form of electrode wherein oxygen supply tubes 22 and 23 are located adjacent the carbon, connected to a common source and adapted to deliver jets of oxygen toward the metal to be cut.

Figs. 6 and 7 show a further modified form wherein a plurality of bores, herein three bores 24, 25 and 26, are provided in the electrode. The end of the electrode may be provided with a cap 27 to which the oxygen supply is connected.

Heretofore no mention has been made of the condition under which the herein described method and apparatus may be used. The more general application of the method may be to work in air but we have discovered that an electric arc may be used to advantage upon metal which is under water. Preferably for such work a high frequency alternating current of high amperage is used and this use of the arc is illustrated in Fig. 3 which shows the apparatus under water. Obviously the lead wires are well insulated. The formation of the arc under water is effected in the usual way and the arc when formed gives off such a great amount of heat that the water immediately surrounding the arc is turned to steam so rapidly that it is prevented from coming into immediate contact with the arc crater formed on the metal, thus permitting the metal to be raised to a temperature above its melting point. Moreover the hydrogen and oxygen of the steam is probably dissociated to some extent so that oxygen is freed to oxidize the heated metal.

If desired, an oxygen jet may be used in cutting under as well as above water. Fig. 2 illustrates the use of the apparatus of Fig. 1 for such purposes. Preferably the oxygen pressure is increased by the amount of water pressure at the depth of the work.

If desired a combustible gas such as hydrogen or acetylene or a suitable combination of gases may be directed into the arc, the combustible gas to assist the generation of heat and neutralize the cooling effect of the oxygen jet.

It will be understood that the invention is not limited to the particular method and apparatus herein described, but that they may be modified within the scope of the subjoined claims.

We claim as our invention:

1. The method of cutting metal under water which consists in forming an electric arc to the metal and moving said arc along a predetermined line of section.

2. The method of cutting metal under water by subjecting it to the action of an electric current which method consists in displacing the water in the space between an electrode and the metal whereupon an arc is formed in said space and acts upon said metal.

3. The method of cutting metal under water by subjecting it to the action of an electric current which method consists in displacing the water in the space between an electrode and the metal by the action of the current whereupon an arc is formed in said space and acts upon the metal.

4. The method of perforating metal under water which consists in placing an electrode adjacent the metal to be perforated, supplying an electric current to the electrode and thereby forming an arc of sufficiently high temperature to generate steam, thereby displacing the surrounding water, and to melt the metal.

5. The method of perforating metal under water which consists in placing an electrode adjacent the metal to be perforated, supplying an alternating current to the electrode and thereby forming an arc of sufficiently high temperature to generate steam thereby displacing the surrounding water, and to melt the metal.

6. The method of cutting metal under water by subjecting it to the action of an electric current which method consists in displacing the water in the space between an electrode and the metal whereupon an arc is formed in said space and acts upon the metal, and maintaining the displacement of the water by the combination of the arc with an oxidizing agent, which combination also acts to cut the metal.

7. The method of perforating metal under water which consists in placing an electrode adjacent the metal to be perforated, supplying an electric current to the electrode and thereby forming an arc and supplying an oxidizing agent to the arc to partially oxidize the metal.

8. The method of perforating metal under water which consists in placing an electrode adjacent the metal to be perforated, supplying an alternating current to the electrode and thereby forming an arc and supplying an oxidizing agent to the arc to partially oxidize the metal.

9. The method of perforating metal under water which consists in placing an electrode adjacent the metal to be perforated, supplying an electric current to the electrode and thereby forming an arc and directing a jet of oxygen under pressure into the arc and toward the metal.

10. The method of perforating metal under water which consists in placing an electrode adjacent the metal to be perforated, supplying an alternating current to the electrode and thereby forming an arc and directing a jet of oxygen under pressure into the arc and toward the metal.

11. An electrode for use in cutting metal having a plurality of longitudinal bores through which oxygen may be supplied to an arc formed by said electrode.

In testimony whereof, we have signed our names to this specification this 28th day of June 1918.

RALPH E. CHAPMAN.
JOHN W. KIRK.